STATES PATENT OFFICE.

WALTER GASTON, OF NEW YORK, N. Y.

METHOD OF TREATING CARBON ELECTRODES.

979,465.      Specification of Letters Patent.      Patented Dec. 27, 1910.

No Drawing.      Application filed March 9, 1910. Serial No. 548,162.

*To all whom it may concern:*

Be it known that I, WALTER GASTON, a citizen of the United States, and a resident of New York, in the county of New York and State of New York, have invented certain new and useful Improvements in the Method of Treating Carbon Electrodes, of which the following is a specification.

My invention relates to carbon electrodes. It relates further to carbon electrodes designed to be used in electro-metallurgical furnaces and operations.

It relates particularly to a process of treating said electrodes, especially large ones used in electric furnaces, so that the breaking, loss in conductivity and other hitherto inherent defects may be remedied.

The object of my invention is to furnish a simple, economical and practical method of treating the baked electrodes, whereby they are rendered more homogeneous, more conductive, more efficient, and in which the breakage in operation is practically eliminated.

Large electrodes have become a necessity in electrometallurgy at the present time, but it is difficult to secure those which do not show cracks in baking, thereby causing them to deteriorate in conductivity, and fall in large or small pieces into the furnaces. This, besides being expressive of carbons, tends to spoil the bath and interfere with the commercial success of operations. To obviate these disadvantages in large electrodes, many consumers have resorted to the expedient of bunching a number of small electrodes together. This gives better results, but it is expensive and tedious.

Various reasons may be assigned for the breakage, among which may be mentioned the following:—1. Too sudden application of temperature in the electric furnace. 2. Unequal pressure in making up the electrode, thus causing a difference of density at different points. 3. Non-uniformity of conductivity. 4. Weak points resulting from pressure from gases during baking, and unequal distribution of the temperature in the baking furnace. 5. Absorption of moisture during storage or transportation, etc.

An electrode will sometimes go to pieces gradually, small pieces dropping off from time to time into the furnace, seriously interfering with the efficiency of the furnace and the quality of the product.

The object of my invention is to remedy these inconveniences, and reduce the breakage and useless electrical deterioration to practically *nil*.

To carry out my invention, I take the electrode as it comes from the baking furnace hot, and plunge it into a solution of boiling tar and pitch, where it is allowed to remain until entirely impregnated with the solution. I leave it in the solution for from 24 to 36 hours, and the electrode when removed from the solution will weigh from 25 to 50 per cent. more than before its immersion, depending on the size. The electrode is now ready for use without any further baking or treatment. It is of course understood that the electrode can be dipped into the solution at any time after coming out of the baking oven. There is, however, an advantage in dipping it hot, since then the occluded gases have become expelled, the cracks are at their widest, and, as well known, a hot porous body absorbs better than a cold one. If the electrodes are put when cold into the boiling solution, the cold electrode cools off the solution in its immediate neighborhood, and this must become heated before it can absorb readily. Moreover, if put in when cold much of the occluded gas, and possible moisture, may be caught and retained by the entering hot solution. This operation really adds a second binder to the electrode, and any good thick hydrocarbon will answer, though I have attained excellent and most satisfactory results with the above-named binder. This binder does not impair the conductivity, but rather improves it. By this saturation with the solution, the absorption of moisture during storage or transportation will be avoided, and the electrode can be submitted immediately without any further treatment to the high temperature of the metallurgical furnace. Any cracks appearing will be at once closed up by this second binder, the volatile matter being at once driven off, and what were cracks become automatically made a part of the solid electrode, the conductivity being equal to the best part of the same. Dropping off of small parts of the electrode will be largely prevented, since the solution is evenly distributed over the entire electrode and will immediately act when cracks appear.

Having thus fully described my invention, and the manner in which the same is to be carried out, what I claim, is:—

1. The process of treating carbon electrodes, which consists in immersing the finished carbon electrode in a boiling solution of liquid hydrocarbon, allowing the electrode to remain in the solution until it becomes thoroughly impregnated therewith, the liquid hydrocarbon being retained therein as such.

2. The method of preventing cracking in electric carbons while in use which consists in subjecting the hot electrode as it comes from the baking furnace to the action of a hot solution of boiling tar and pitch allowing the electrode to become thoroughly saturated with said solution, which is retained therein as such.

3. The process of providing a finished carbon electrode with a second binder, which consists in immersing the hot electrode as it comes from the baking furnace in a boiling solution of pitch and tar, allowing the cracks and pores of the electrode to become filled with the solution, the same being retained therein as such.

4. The method of automatically preventing cracking in large carbon electrodes, which consists in saturating the hot electrode as it comes from the baking furnace with a thick hydrocarbon solution which is retained as such in the electrode.

5. As an article of manufacture, a carbon electrode which has been baked in the regular baking furnace and whose cracks and pores have been saturated with a thick boiling hydrocarbon liquid and which is retained in there as such.

Signed at Niagara Falls, in the county of Niagara and State of New York, this 5th day of March A. D. 1910.

WALTER GASTON.

Witnesses:
H. M. CLARK,
JAS. M. SPULLER.